United States Patent [19]

Kawaguchi

[11] Patent Number: 5,142,009
[45] Date of Patent: Aug. 25, 1992

[54] HARD CONTACT LENS MATERIAL

[75] Inventor: Toru Kawaguchi, Gufu, Japan

[73] Assignee: Tomei Sangyo Kabushiki Kaisha, Nagoya, Japan

[21] Appl. No.: 209,713

[22] Filed: Jun. 22, 1988

Related U.S. Application Data

[62] Division of Ser. No. 922,904, Oct. 24, 1986, Pat. No. 4,868,260.

[51] Int. Cl.⁵ .................. C08F 18/20; C08F 18/02; C08F 20/18
[52] U.S. Cl. .................. 526/245; 526/242; 526/247; 526/279; 526/323
[58] Field of Search .............. 526/323, 242, 279, 245, 526/247

[56] References Cited

U.S. PATENT DOCUMENTS

| | | | |
|---|---|---|---|
| 3,513,225 | 5/1970 | Sherr | 526/245 |
| 4,224,427 | 9/1980 | Mueller et al. | 526/93 |
| 4,632,968 | 12/1986 | Yokota et al. | 526/279 |
| 4,639,229 | 1/1987 | Itoh et al. | 55/68 |

FOREIGN PATENT DOCUMENTS

| | | |
|---|---|---|
| 2557708 | 7/1985 | France . |
| 2561538 | 9/1985 | France . |
| 2119951A | 11/1983 | United Kingdom . |

Primary Examiner—Thurman K. Page
Assistant Examiner—Peter F. Kulkosky
Attorney, Agent, or Firm—Armstrong, Nikaido, Marmelstein, Kubovcik & Murray

[57] ABSTRACT

A hard contact lens material comprising a copolymer made of at least two kinds of fumaric acid diester at least one of which is a dialkyl fumarate as main components. The hard contact lens material has high oxygen permeability, transparance and excellent physical properties.

20 Claims, 1 Drawing Sheet

HARD CONTACT LENS MATERIAL

This is a division, of application Ser. No. 922,904 filed Oct. 24, 1986, now U.S. Pat. No. 4,868,260.

BACKGROUND OF THE INVENTION

The present invention relates to a hard contact lens material, and more particularly to a hard contact lens material having a high oxygen permeability.

A glass material hitherto has been mainly used as a hard contact lens material, but nowadays polymethyl methacrylate which is superior in cutting-processability and flexibility to the glass material and is light is used as a hard contact lens material.

However, since the hard contact lens material comprising polymethyl methacrylate is poor in oxygen permeability, the obtained contact lens has a problem that a methabolism disorder of the cornea tissue is occurred when the contact lens is used on the surface of a cornea tissue for a long period of time.

Thereupon the study and the development of a hard contact lens material having a high oxygen permeability which can be substituted for the contact lens material comprising polymethyl methacrylate have been attempted, and in these days, for example, a contact lens material comprising a copolymer mainly made of fluorinated (meth)acrylic acid esters, a contact lens material which is produced by at first introducing a vinyl polymerizable group into (poly)organosiloxane and then copolymerizing the (poly)organosiloxane with other vinyl monomers, and the like are obtained.

Though the oxygen permeability of the copolymer comprising (poly)organosiloxane in which vinyl polymerizable groups are introduced and other vinyl monomers is not so high, the copolymer enables to improve the oxygen permeability of an obtained hard and optically clear acryl resin, to promote the oxygen permeability to a cornea when it is used as a hard contact lens which is contacted with a cornea and to prevent the lowering of a cornea function caused by the lack of oxygen.

However, a large amount of acryl monomers is needed in order to copolymerize (poly)organosiloxane in which vinyl polymerizable groups are introduced, with the acryl monomer and to give a sufficient oxygen permeability as a contact lens. As the results, the obtained copolymer has some problems such as inferiority of processability at the time of producing a contact lens and lowering of intensity as a lens. On the other hand, for the sake of maintaining the hardness which can be tolerable for the processability when producing a lens, it is impossible to be added a large amount of the (poly)organosiloxane in which vinyl polymerizable groups are introduced, in the acryl monomer, and further, a hard contact lens material having an oxygen permeability sufficient for extensively wearing has not yet been obtained.

On the other hand, a hard contact lens material in which fluorinated (meth)acrylic acid esters are used shows excellent porperties in hardness. However, it cannot be used in a contact lens which is extensively weared on the surface of a cornea tissue since the oxygen permeability is low. Further, though it is disclosed in U.S. Pat. No. 4,433,125 (Ichinohe et al) that a copolymer of the fluorinated (meth)acrylic acid esters and the (poly)organosiloxane in which vinyl polymerizable groups are introduced shows a very high oxygen permeability and is relatively excellent in hardness, the oxygen permeability is not sufficient for the extensively wearing.

The present invention is accomplished in order to remove the above-mentioned disadvantages and to obtain a hard contact lens which comprises materials having a preferable hardness and hard quality as a hard contact lens and higher oxygen permeability than prior oxygen permeable hard contact lenses.

As the results of my researches, I have eventually found that when a copolymer which comprises at least two kinds of fumaric acid diesters at least one of which is a dialkyl fumarate as main components are employed as a contact lens material, the obtained contact lens material shows excellent oxygen permeability and has preferable mechanical strength as a contact lens.

These and other objects of the present invention will become apparent from the description hereinafter.

SUMMARY OF THE INVENTION

In accordance with the present invention, there is provided a hard contact lens material made of a copolymer comprising at least two kinds of fumaric acid diesters at least one of which is a dialkyl fumarate as main components.

DETAILED DESCRIPTION OF THE INVENTION

Figure 1:
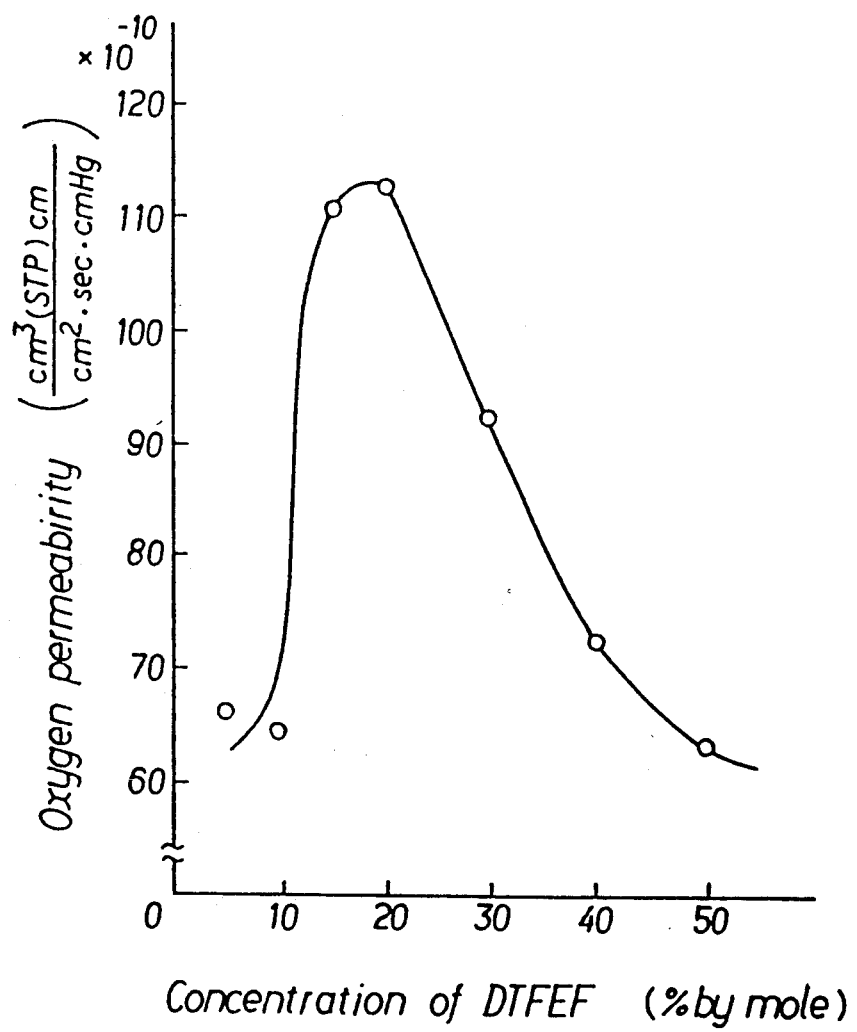
FIG. 1 is a graph showing the results of the relation between the amount of bis(trifluoroethyl) fumarate which is used in Examples 1 to 7 of the present invention and the oxygen permeability.

In accordance with the present invention, there is provided a hard contact lens material made of a copolymer comprising at least two kinds of fumaric acid diesters at least one of which is a dialkyl fumarate as main components.

Representative examples of the above-mentioned dialkyl fumarate are those represented by the general formula (I):

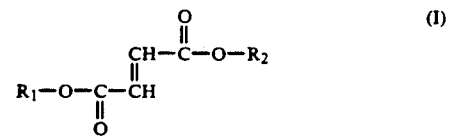

wherein $R_1$ and $R_2$ are the same or different, and each is a straight alkyl group, a branched alkyl group or a cyclic alkyl group having 1 to 13 carbon atoms.

Examples of the dialkyl fumarate are, for instance, a straight or branched dialkyl fumarate such as diethyl fumarate, dipropyl fumarate, diisopropyl fumarate, dibutyl fumarate, di-tert-butyl fumarate, dipentyl fumarate, dioctyl fumarate, di-tert-amyl fumarate, didodecyl fumarate, di(2-ethylhexyl) fumarate, and the like; cyclic alkyl fumarate such as dicyclohexyl fumarate, di(tert-butylcyclohexyl) fumarate, bis(trimethylcyclohexyl) fumarate, and the like. Among the above-mentioned alkyl fumarates, di-tert-butyl fumarate (hereinafter referred to as DtBF) represented by the formula (II):

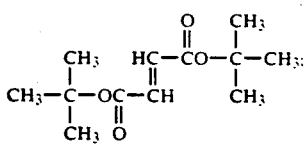

(II)

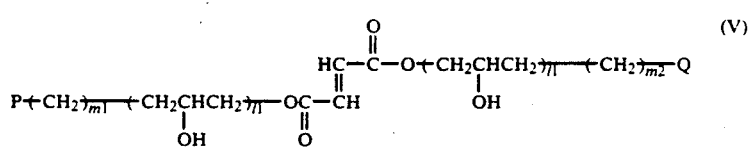

(V)

wherein P and Q are the same or different, and each is a group selected from the group consisting of

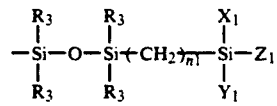

($X_1$, $Y_1$ and $Z_1$ are the same or different and each is $-R_3$ or

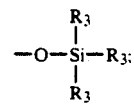

$R_3$ is an alkyl group having 1 to 3 carbon atoms or a phenyl group; $n_1$ represents an integer of 2 or 3),

($X_2$, $Y_2$ and $Z_2$ are the same or different and each is a group selected from the group consisting of $-R_3$ ($R_3$ is the same as mentioned above), $-OZ_3$ ($Z_3$ is

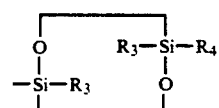

($R_3$ is the same as mentioned above, $R_4$ is an alkyl group or phenyl group having 1 to 3 carbon atoms, r is an integer of 2 to 4)) and

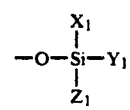

($X_1$, $Y_1$ and $Z_1$ are the same as mentioned above)), $-Si(OSi(CH_3)_3)_{3-q}(OSiH(CH_3)_2)_q$ (q is an integer of 1 to 3) and $-Z_3$ ($Z_3$ is the same as mentioned above); $m_1$ and $m_2$ are the same or different and each is an integer of 1 or 3; $l_1$ and $l_2$ are the same or different and each is an integer of 0 or 1.

Examples of the above-mentioned di(silicon-containing alkyl) fumarate are, for instance, bis((tetrakis-(trimethylsilyloxy)trimethyltrisiloxanyl)propyl) fumarate, bis(tetramethyltriisopropylcyclotetrasiloxanylpropyl) fumarate, bis(tetramethyltriisopropylcyclotetrasilyloxdiisopropyl fumarate, dicyclohexyl fumarate, and the like can be suitably used since these alkyl fumarates are excellent in polymerizability, and particularly, DtBF is preferably used since it is excellent in homopolymerizability and copolymerizability.

However, since homopolymers of the above-mentioned fumaric acid dialkyl esters are generally hard and brittle, it is preferable that these fumaric acid dialkyl esters are copolymerized with a monomer, for instance, diethyl fumarate, di-n-butyl fumarate, di-n-octyl fumarate, or the like to improve the mechanical strength (brittleness).

Examples of fumaric acid diesters other than the above-mentioned dialkyl fumarates are, for instance, di(fluoroalkyl) fumarate, di(silicon-containing alkyl) fumarate, and the like.

Representative examples of the above-mentioned di(fluoroalkyl) fumarate are those represented by the general formula (III):

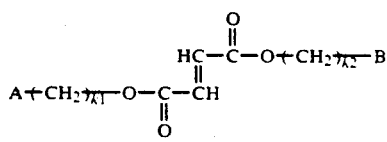

(III)

wherein A and B are the same or diffeerent, and each is $-C_aH_bF_{2a+1-b}$, a is an integer of 1 to 21, b is 0 or 1; each of $k_1$ and $k_2$ is an integer of 0 to 3.

Examples of the above-mentioned di(fluoroalkyl) fumarate are, for instance, bis(trifluoroethyl) fumarate, bis(tetrafluoropropyl) fumarate, bis(hexafluoroisopropyl) fumarate, bis(octafluoropentyl) fumarate, bis(dodecafluoroheptyl) fumarate, and the like. Among the above-mentioned di(fluoroalkyl) fumarates, bis(trifluoroethyl) fumarate, bis(hexafluoroisopropyl) fumarate, bis(tetrafluoropropyl) fumarate, and the like are preferably used since these monomers can be easily prepared and the monomer materials can be easily obtained.

In the above-mentioned di(fluoroalkyl) fumarate, bis(trifluoroethyl) fumarate (hereinafter referred to as DTFEF) represented by the formula (IV):

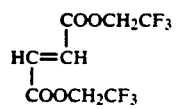

(IV)

is particularly useful for a hard contact lens material since the hard contact lens obtained by copolymerizing the dialkyl fumarate with DTFEF shows excellent oxygen permeability as well as suitable mechanical strength.

Representative examples of the above-mentioned di(silicon-containing alkyl) fumarate are those represented by the general formula (V):

ybis(trimethylsilyloxy)silylpropyl) fumarate, di(silicon-containing alkyl) fumarate (hereinafter referred to as DSiAF) represented by the general formula (VI):

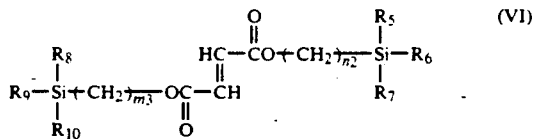

wherein $m_3$ and $n_2$ are the same or different and each is an integer of 1 or 3; $R_5$, $R_6$, $R_7$, $R_8$, $R_9$, $R_{10}$ are the same or different, and each is methyl group or

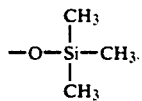

In these di(silicon-containing alkyl) fumarates, since DSiAF can be easily synthesized and purified, it is preferably used. Further, DSiAF wherein both $m_3$ and $n_2$ are 3 in the general formula (VI) is preferably used since it shows a high polymerization velocity and a high degree of polymerization. In particular, among them, bis(trimethylbis(trimethylsilyloxy)disiloxanyl)propyl) fumarate is most preferably used since it gives a polymer having a high oxygen permeability. Also, since the above-mentioned di(silicon-containing alkyl) fumarate is not polymerized by itself but it is easily copolymerized with dialkyl fumarates and the obtained hard contact lens material shows optical clearity and proper mechanical strength as well as excellent oxygen permeability, it is preferably used.

Examples of the above-mentioned DSiAF are, for instance, bis(3-(trimethylsilyl)propyl) fumarate, bis(3-(pentamethyldisiloxanyl)propyl) fumarate, bis(3-(1,3,3,3-tetramethyl-1-(trimethylsilyl)oxy)disiloxanyl)-propyl) fumarate, bis(3-(3,3,3-trimethyl-1,1-bis((trimethylsilyl)oxy)disloxanyl)propyl) fumarate, (3-trimethylsilyl)propyl)(3-(pentamethyldisiloxanyl)propyl) fumarate, bis((pentamethyldisiloxanyl)methyl) fumarate, and the like. The above-mentioned fumaric acid diesters are divided into (a) dialkyl fumarates having an excellent polymerizability such as DtBF, diisopropyl fumarate or dicyclohexyl fumarate;
(b) dialkyl fumarates other than the above (a);
(c) difluoroalkyl fumarates; and
(d) di(silicon-containing alkyl) fumarates.

When the obtained copolymer consists of the above (a) and (b), the used amount of (a) and (b) is not limited but it is preferable that the used amount of (a) is not less than 50 mole parts from the viewpoint of polymerizability, in particular, the used amount of (a) is not more than 95 mole parts from the viewpoint of brittleness of the obtained copolymer based on 100 mole parts of the total amount of fumaric acid diesters. Also, since neither the above (c) nor (d) is polymerized by itself, it is necessary that the used amount (c) and (d) is not more than 50 mole parts respectively based on 100 mole parts of the total amount of fumaric acid diesters. Further, it is preferable that the used amount of (c) and (d) are not less than 5 mole parts respectively based on 100 mole parts of the total amount of fumaric acid diesters to give the effect of the added (c) and (d).

More particularly, when only (a) and (b) are employed as fumaric acid diesters, the used amount of (a) is 70 to 90 mole parts, and when the combination of (a) and (c), or (a) and (d) is employed as fumaric acid diesters, the used amount of (c) and (d) is 10 to 45 mole parts respectively based on 100 mole parts of the total amount of fumaric acid diesters.

Further, in the hard contact lens material of the present invention, one or not less than two of fumaric acid diesters selected from the group consisting of alkyl(fluoroalkyl) fumarates, alkyl(silicon-containing alkyl) fumarates and fluoroalkyl (silicon-containing alkyl) fumarates can be used other than the above-mentioned di(fluoroalkyl) fumarate and di(silycon-containing alkyl) fumarate.

Representative examples of the above-mentioned alkyl(fluoroalkyl) fumarate are, for instance, those represented by the general formula (VII):

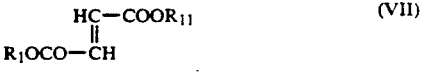

wherein $R_1$ is a linear, branched or cyclic alkyl group having 1 to 13 carbon atoms and $R_{11}$ is $-CH_2)_{k_3}C_cH_dF_{2c+1-d}$, c is an integer of 1 to 21, d is 0 or 1 and $k_3$ is an integer of 0 to 3.

Examples of the above-mentioned alkyl(fluoroalkyl) fumarate are, for instance, methyl(trifluoroethyl) fumarate, ethyl(trifluoroethyl) fumarate, isopropyl(trifluoroethyl) fumarate, tertbutyl(trifluoroethyl) fumarate, octyl(trifluoroethyl) fumarate, cyclohexyl(trifluoroethyl) fumarate, methyl(hexafluoroisopropyl) fumarate, ethyl(hexafluoroisopropyl) fumarate, isopropyl(hexafluoroisopropyl) fumarate, tert-butyl(hexafluoroisopropyl) fumarate, octyl(hexafluoroisopropyl) fumarate, cyclohexyl(hexafluoroisopropyl) fumarate, methyl(octafluoropentyl) fumarate, ethyl(octafluoropentyl) fumarate, isopropyl(octafluoropentyl) fumarate, tert-butyl(octafluoropentyl) fumarate, octyl(octafluoropentyl) fumarate, cyclohexyl(octafluoropentyl) fumarate, and the like.

Representative examples of the above-mentioned alkyl (silicon-containing alkyl) fumarate are those represented by the general formula (VIII):

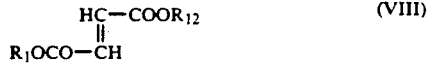

wherein $R_1$ is the same as mentioned above; $R_{12}$ is

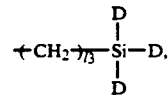

wherein $l_3$ is 1 or 3, D is $-CH_3$ or

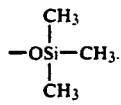

Examples of the above-mentioned alkyl(silicon-containing alkyl) fumarate are, for instance, methyl(trimethylsilylpropyl) fumarate, ethyl(trimethylsilylpropyl) fumarate, isopropyl(trimethylsilylpropyl) fumarate, tert-butyl(trimethylsilylpropyl) fumarate, octyl(trimethylsilylpropyl) fumarate, cyclohexyl(trimethylsilylpropyl) fumarate, methyl(pentamethyldisiloxanylpropyl) fumarate, ethyl(pentamethyldisiloxanylpropyl) fumarate, isopropyl(pentamethyldisiloxanylpropyl) fumarate, tert-butyl(pentamethyldisiloxanylpropyl) fumarate, octyl(pentamethyldisiloxanylpropyl) fumarate, cyclohexyl(pentamethyldisiloxanylpropyl) fumarate, methyl((tetramethyl(trimethylsilyloxy)disiloxanyl)propyl) fumarate, ethyl((tetramethyl(trimethylsilyloxy)disiloxanyl)propyl) fumarate, isopropyl((tetramethyl(trimethylsilyloxy)disiloxanyl)propyl) fumarate, tert-butyl((tetramethyl(trimethylsilyloxy)disiloxanyl)propyl) fumarate, octyl((tetramethyl(trimethylsilyloxy)disiloxanyl)propyl) fumarate, cyclohexyl((tetramethyl(trimethylsilyloxy)disiloxanyl)propyl) fumarate, methyl((trimethylbis(trimethylsilyloxy)disiloxanyl)propyl) fumarate, ethyl((trimethylbis(trimethylsilyloxy)disiloxanyl)propyl) fumarate, isopropyl((trimethylbis(trimethylsilyloxy)disiloxanyl)propyl fumarate, tert-butyl((trimethylbis(trimethylsilyloxy)disiloxanyl)propyl) fumarate, octyl((trimethylbis(trimethylsilyloxy)disiloxanyl)propyl) fumarate, cyclohexyl((trimethylbis(trimethylsilyloxy)disiloxanyl)propyl) fumarate, and the like.

Representative examples of the above-mentioned fluoroalkyl(silicon-containing alkyl) fumarate are, for instance, those represented by the general formula (X):

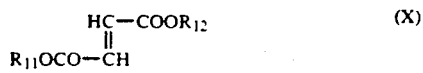

wherein $R_{11}$ and $R_{12}$ are the same as mentined above.

Examples of the above-mentioned fluoroalkyl(silicon-containing alkyl) fumarate are, for instance, trifluoroethyl(trimethylsilylpropyl) fumarate, hexafluoroisopropyl(trimethylsilylpropyl) fumarate, octafluoropentyl(trimethylsilylpropyl) fumarate, trifluoroethyl((tetramethyl(trimethylsilyloxy)disiloxanyl)propyl) fumarate, hexafluoroisopropyl((tetramethyl(trimethylsilyloxy)disiloxanyl)propyl) fumarate, octafluoropentyl((tetramethyl(trimethylsilyloxy)disiloxanyl)propyl) fumarate, trifluoroethyl((trimethylbis(trimethylsilyloxy)disiloxanyl)propyl) fumarate, hexafluoroisopropyl((trimethylbis(trimethylsilyloxy)disiloxanyl)propyl) fumarate, octafluoropentyl((trimethylbis(trimethylsilyloxy)disiloxanyl)propyl) fumarate, and the like.

In order to improve the hydrophilic property of the obtained hard contact lens, alkyl(hydroxyalkyl) fumarate and monoalkyl fumarate may be contained in the fumaric acid diester.

Representative examples of the above-mentioned alkyl(hydroxyalkyl) fumarate are those represented by the general formula (IX):

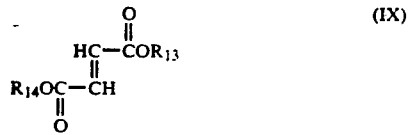

wherein $R_{13}$ is an alkyl group having 1 to 8 carbon atoms, and $R_{14}$ is a hydroxyalkyl group having 1 to 8 carbon atoms.

Examples of alkyl(hydroxyalkyl) fumarate are, for instance, isopropyl(2-hydroxyethyl) fumarate, ethyl(2-hydroxyethyl) fumarate, n-butyl(2-hydroxyehtyl) fumarate, ethyl(2-hydroxypropyl) fumarate, isopropyl(2-hydroxypropyl) fumarate, n-butyl(2-hydroxypropyl) fumarate, ethyl(2-hydroxybutyl) fumarate, isopropyl(2-hydroxybutyl) fumarate, n-butyl(2-hydroxybutyl) fumarate, and the like. Among them, when $R_{13}$ in the general formula (IX) is isopropyl group, a fumaric acid diester can be easily synthesized, and when $R_{14}$ in the general formula (IX) is 2-hydroxyalkyl group, particularly 2-hydroxyethyl group, the obtained alkyl(hydroxyalkyl) fumarate shows excellent polymerizability and compatibility with dialkyl fumarate.

Examples of the above-mentioned monoalkyl fumarate are, for instance, mono-n-butyl fumarate, monoisopropyl fumarate, mono-tert-butylfumarate. However, when the monoalkyl fumarate is employed, since the monoalkyl fumarate is poor in polymerizability, it is preferable that, e.g., after a carboxylic acid is protected with trimethylsilyl groups, the obtained monoalkyl fumarate is subjected to copolymerization and then after producing a contact lens, the trimethylsilyl group is removed by acid-treatment.

When the amount of the above-mentioned alkyl(hydroxyalkyl) fumarate and monoalkyl fumarate are respectively less than 5 mole parts based on 100 mole parts of the total amount of fumaric acid diesters, the hydrophilic property is lowered. When the amount of the alkyl(hydroxyalkyl) fumarate is more than 30 mole parts the oxygen permeability is lowered. That is why the amount of the alkyl(hydroxyalkyl) fumarate is 5 to 30 mole parts, preferably 10 to 20 mole parts based on 100 mole parts of the total amount of fumaric acid diesters.

The used amount of these fumaric acid diesters, that is, alkyl(fluoroalkyl) fumarate, alkyl(silicon-containing alkyl) fumarate, fluoroalkyl(silicon-containing alkyl) fumarate, alkyl(hydroxyalkyl) fumarate and monoalkyl fumarate should be not more than 50 mole parts based on 100 mole parts of the total amount of fumaric acid diesters, and it is preferable that the used amount is at most 40 mole parts based on 100 mole parts of the total amount of fumaric acid diesters.

In addition to the above-mentioned fumaric acid diesters, further various kinds of monomers can be used to denaturalize the properties of the obtained copolymer in accordance with the various purposes. The used amount of these monomers are at most 35 mole parts based on 100 mole parts of the total amount of fumaric acid diesters.

Cross-linkable monomers are suitable used in these monomers for the purpose of stabilizing the specification such as size and power (degree) of the obtained hard contact lens and improving the chemical resistance. Examples of the above-mentioned cross-linkable monomers are, for instance, diallyl fumarate, allyl methacrylate, allyl acrylate, trimethylolpropane trimethacrylate, trimethylolpropane triacrylate, ethylene glycol diacrylate, ethylene glycol dimethacrylate, divinylbenzen, a cross-linking agent represented by the general formula (XI):

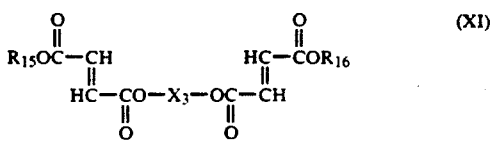

wherein $R_{15}$ and $R_{16}$ are respectivelly, independently, selected from the group of $R_1$, $R_{11}$ and $R_{12}$; $X_3$ is a ethylene group or a group having the formula:

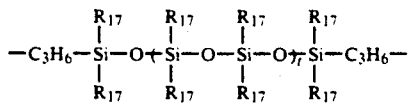

wherein $R_{17}$ is $-CH_3$ or

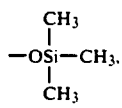

t is an integer of 0 to 55; and the like.

It is preferable that one or more than two kinds of the cross-linking agents selected from the above-mentioned monomers are used. In the above-mentioned cross-linking agents, it is most preferable to use a diallyl fumarate or the cross-linking agent represented by the general formula (XI).

The used amount of the cross-linking agent is 0 to about 20 mole parts based on 100 mole parts of the total amount of monomers.

In the present invention, various kinds of monomers having vinyl polymerizable groups, for instance, monomerized dyes such as Seikagen-O-Real Black (BLK-1416) (made by DAINICHI SEIKA COLOR & CHEMICALS MFG. CO., LTD.), monomerized ultraviolet ray absorbing agents such as 2-hydroxy-5-acryloxyphenyl-2-hydroxybenzotriazole, and the like can be used in order to modify the properties of the obtained contact lens material. The used amount of these monomers is preferably less than 5% by weight in all of fumaric acid diesters to maintain the high oxygen permeability.

The hard contact lens material of the present invention is produced by mixing at least two kinds of fumaric acid diester at least one of which is a dialkyl fumarate and as occasion demands adding dyes, ultraviolet ray absorbing agents and monomers into the fumaric acid diesters and then polymerizing. The polymerization reaction is preferably carried out at a temperature of 50° to 130° C. for 10 to 168 hours.

Such polymerization process as block polymerization process, solution polymerization process or suspension polymerization process can be applied in the present invention. Among these polymerization processes, it is preferable to apply the block polymerization process since the conversion can be increased.

When these monomers are subjected to the polymerization, a polymerization initiator such as azobisisobutylonitrile, benzoyl peroxide or azobisdimethylvaleronitrile can be used. These polymerization initiators may be employed alone or in admixture thereof. The used amount of the polymerization initiators are preferably 0.01 to 1.0 mole parts based on 100 mole parts of the total amount of the monomers.

Further, in case that unreacted monomers are contained in the obtained polymer, in order to remove unreacted monomers from the polymer, it is preferable that the polymer is dissolved in a good solvent such as chloroform, tetrahydrofuran or benzene and then they are mixed with a poor solvent such as methanol or acetone to precipitate the obtained polymer.

The obtained hard contact lens has a number average molecular weight of 20,000 to 200,000 and a weight average molecular weight of 60,000 to 1,000,000.

As a molding process for producing a contact lens from the above-mentioned monomer mixture, there can be employed usual processes. Examples of the process are, for instance, a process that the copolymerization reaction of the above-mentioned monomer mixture is carried out directly in a mold having a shape corresponding to a contact lens and then the obtained polymer is subjected to finishing processing such as mechanically cutting or polishing to give a contact lens, a process that making a material having a block form, boad form or cylinder form by copolymerizing the monomers in a suitable mold or vessel and then subjecting the copolymer to finishing processing such as mechanically cutting or polishing to give a contact lens having a desired shape, and the like.

Further, a hard contact lens can be produced by disolving the polymer products prepared by the above-mentioned process into a suitable solvent, conducting the obtained solution into a mold having a shape to be easily processed into the shape of a contact lens, removing the solvent from the polymer and then processing the polymer into the shape of a contact lens. As a mold used in the present invention, there is used, for instance, a mold made of glass, polypropylene, Teflon or polyacetal. In this case, the obtained contact lens is a little superior in oxygen permeability to a contact lens produced by the process in which a solvent is not used. Further, as occasion demands, discharge treatment such as corona discharge or plasma discharge can be applied to the obtained contact lens, and after the discharge treatment, such a process that a hydrophilic monomer such as (meth)acryl amide, (meth)acrylic acid or N-vinyl pyrolidone is subjected to the graft-polymerization with the obtained polymer or that the obtained polymer is treated with a strong acid such as hydrochloric acid or nitric acid can be applied in order to improve the hydrophic property of the surface of the obtained contact lens.

Thus the obtained hard contact lens of the present invention shows excellent oxygen permeability and suitable hardness and processability as well as hidrophilic preperty.

The present invention is more specifically described and explained by means of the following Examples. It is to be understood that the present invention is not limited to Examples, and various changes and modifications may be made in the invention without departing from the spirit and scope thereof.

EXAMPLE 1

An ampul made of glass having a volume of 50 ml was charged with 0.022 mole (5.0 g) of di-tert-butyl fumarate and 0.022 mole (6.14 g) of bis(2,2,2-trifluoroethyl) fumarate and then with $4.39 \times 10^{-5}$ mole (0.0072 g) of azobisisobutylonitrile as a polymerization initiator. The ampul was decompressed to $10^{-3}$ mmHg and was sealed up, and then the polymerization reaction was carried out at a temperature of 60° C. for 36 hours.

After the reaction, the obtained polymer was dissolved in 100 ml of chloroform and the solution was poured into a large amount of methanol to give a precipitate. The obtained precipitate was filtered and dried to give a formed polymer.

The number average molecular weight of the formed polymer was $9.5 \times 10^4$ when it was measured by using a gel permeation chromatography (hereinafter referred to as GPC).

The measurement of the molecular weight was carried out by using a Trirotor III GPC analyzer (made by Japan Spectroscopic Co., Ltd.), (column: Shodex GPC A-80M made by Showa Denko Kabushiki Kaisha; solvent: tetrahydrofuran).

The obtained polymer was dissolved into chloroform to give 10% by weight of a polymer solution and the polymer solution was flowed and extended on a glass schale having a diameter of 50 mm and then the solvent was vaporized at a room temperature to give a film. Further, after peeling the film off the schale, the film was dried at least for 48 hours under vacuum to give a colorless and transparent film.

The obtained film was cut off into a film having a diameter of 15 mm and a thickness of 0.204 mm, and then the oxygen permeability was measured by using a film oxygen-gas permeater of Seikaken type (made by Rikenseiki Kogyo Kabushiki Kaisha). The oxygen permeability was $62.6 \times 10^{-10}$ cm$^3$ (STP) cm/cm$^2$ sec cmHg under standard temperature and pressure.

EXAMPLES 2 to 24

The procedure of Example 1 was repeated except that kinds of fumaric acid diesters and polymerization initiators, polymerization temperature and reaction time were changed as shown in Table 1 to give a film. The results are shown in Table 1.

In accordance with the above-mentioned results, the relation between the used amount of bis(trifluoroethyl) fumarate and the oxygen permeability was shown in FIG. 1.

It can be seen from FIG. 1 that when the used amount of bis(trifluoroethyl) fumarate was from 5 to 50% by mole, the oxygen permeability of the obtained contact lens material is not less than 60 cm$^3$ (STP) cm/cm$^2$ sec cmHg, particularly when the used amount of bis(trifluoroethyl) fumarate was from 15 to 30% by mole, the obtained contact lens material shows an excellent oxygen permeability.

EXAMPLES 25 to 32

The procedure of Example 1 was repeated except that kinds of fumalic acid diesters and polymerization initiators, polymerization temperature and reaction time were changed as shown in Table 1 and diethyl ether was used as a solvent. The results are shown in Table 1.

TABLE 1

| Ex. No. | Components of fumaric acid diester (mole parts) | | Polymerization initiator (mole parts) | | Polymerization temperature and time | Thickness (mm) | Oxygen permeability [cm$^3$ (STP) · cm/cm$^2$ · sec · cmHg] | Appearance |
|---|---|---|---|---|---|---|---|---|
| 1 | DtBF | 50 | AIBN | 0.1 | 60° C./36 hrs. | 0.204 | $62.6 \times 10^{-10}$ | Colorless and transparent |
|   | DTFEF | 50 | | | | | | |
| 2 | DtBF | 60 | AIBN | 0.1 | 60° C./36 hrs. | 0.203 | $71.7 \times 10^{-10}$ | Colorless and transparent |
|   | DTFEF | 40 | | | | | | |
| 3 | DtBF | 70 | AIBN | 0.1 | 60° C./36 hrs. | 0.203 | $92.1 \times 10^{-10}$ | Colorless and transparent |
|   | DTFEF | 30 | | | | | | |
| 4 | DtBF | 80 | BPO | 0.1 | 70° C./21 hrs. | 0.203 | $111.7 \times 10^{-10}$ | Colorless and transparent |
|   | DTFEF | 20 | | | | | | |
| 5 | DtBF | 85 | BPO | 0.1 | 72° C./17 hrs. | 0.205 | $110.1 \times 10^{-10}$ | Colorless and transparent |
|   | DTFEF | 15 | | | | | | |
| 6 | DtBF | 90 | BPO | 0.1 | 72° C./17 hrs. | 0.200 | $64.1 \times 10^{-10}$ | Colorless and transparent |
|   | DTFEF | 10 | | | | | | |
| 7 | DtBF | 95 | BPO | 0.1 | 72° C./17 hrs. | 0.200 | $65.9 \times 10^{-10}$ | Colorless and transparent |
|   | DTFEF | 5 | | | | | | |
| 8 | DtBF | 50 | AIBN | 0.1 | 60° C./39 hrs. | 0.193 | $11.6 \times 10^{-10}$ | Colorless and transparent |
|   | DEF | 50 | | | | | | |
| 9 | DtBF | 80 | BPO | 0.1 | 72° C./17 hrs. | 0.199 | $31.9 \times 10^{-10}$ | Colorless and transparent |
|   | DEF | 20 | | | | | | |
| 10 | DtBF | 90 | BPO | 0.1 | 72° C./17 hrs. | 0.182 | $41.7 \times 10^{-10}$ | Colorless and transparent |
|   | DEF | 10 | | | | | | |
| 11 | DtBF | 95 | BPO | 0.1 | 72° C./17 hrs. | 0.187 | $38.6 \times 10^{-10}$ | Colorless and transparent |
|   | DEF | 5 | | | | | | |
| 12 | DtBF | 80 | BPO | 0.1 | 72° C./17 hrs. | 0.171 | $39.5 \times 10^{-10}$ | Colorless and transparent |
|   | DnBF | 20 | | | | | | |
| 13 | DtBF | 90 | BPO | 0.1 | 72° C./17 hrs. | 0.142 | $40.2 \times 10^{-10}$ | Colorless and transparent |
|   | DnBF | 10 | | | | | | |
| 14 | DtBF | 50 | AIBN | 0.1 | 60° C./26 hrs. | 0.108 | $43.6 \times 10^{-10}$ | Colorless and transparent |
|   | DS$_1$PF | 50 | | | | | | |
| 15 | DtBF | 50 | BPO | 0.1 | 70° C./14 hrs. | 0.205 | $58.8 \times 10^{-10}$ | Colorless and transparent |
|   | DTFEF | 30 | | | | | | |
|   | DS$_1$PF | 20 | | | | | | |
| 16 | DtBF | 60 | BPO | 0.1 | 70° C./14 hrs. | 0.214 | $67.3 \times 10^{-10}$ | Colorless and transparent |
|   | DTFEF | 30 | | | | | | |
|   | DS$_1$PF | 10 | | | | | | |
| 17 | DtBF | 60 | BPO | 0.1 | 70° C./14 hrs. | 0.177 | $64.7 \times 10^{-10}$ | Colorless and transparent |
|   | DTFEF | 20 | | | | | | |
|   | DS$_1$PF | 20 | | | | | | |
| 18 | DtBF | 70 | BPO | 0.1 | 70° C./14 hrs. | 0.183 | $83.1 \times 10^{-10}$ | Colorless and transparent |
|   | DTFEF | 20 | | | | | | |
|   | DS$_1$PF | 10 | | | | | | |
| 19 | DtBF | 80 | BPO | 0.1 | 70° C./14 hrs. | 0.177 | $82.7 \times 10^{-10}$ | Colorless and transparent |
|   | DTFEF | 10 | | | | | | |
|   | DS$_1$PF | 10 | | | | | | |
| 20 | DtBF | 80 | BPO | 0.1 | 70° C./14 hrs. | 0.201 | $62.5 \times 10^{-10}$ | Colorless and transparent |
|   | DS$_1$PF | 20 | | | | | | |
| 21 | DtBF | 17 | BPO | 0.1 | 72° C./17 hrs. | 0.103 | $78.7 \times 10^{-10}$ | Colorless and |

TABLE 1-continued

| Ex. No. | Components of fumaric acid diester (mole parts) | | Polymerization initiator (mole parts) | | Polymerization temperature and time | Physical properties | | |
|---|---|---|---|---|---|---|---|---|
| | | | | | | Thickness (mm) | Oxygen permeability [cm$^3$ (STP) · cm/cm$^2$ · sec · cmHg] | Appearance |
| | DTFEF | 33 | | | | | | transparent |
| | VAc | 33 | | | | | | |
| | SiMA | 17 | | | | | | |
| 22 | DtBF | 28.6 | BPO | 0.1 | 72° C./17 hrs. | 0.103 | 69.6 × 10$^{-10}$ | Colorless and transparent |
| | DTFEF | 28.6 | | | | | | |
| | VAc | 28.6 | | | | | | |
| | SiMA | 14.2 | | | | | | |
| 23 | DtBF | 25 | BPO | 0.1 | 72° C./17 hrs. | 0.115 | 70.3 × 10$^{-10}$ | Colorless and transparent |
| | DTFEF | 50 | | | | | | |
| | SiMA | 25 | | | | | | |
| 24 | DtBF | 80 | BPO | 0.1 | 64° C./48 hrs. | 0.211 | 103.5 × 10$^{-10}$ | Colorless and transparent |
| | DTFEF | 15 | | | | | | |
| | iP-HEF | 5 | | | | | | |
| 25 | DtBF | 80 | BPO | 0.1 | 70° C./24 hrs. | 0.192 | 93.2 × 10$^{-10}$ | Colorless and transparent |
| | DDMBF | 20 | | | | | | |
| 26 | DtBF | 80 | BPO | 0.1 | 70° C./24 hrs. | 0.175 | 45.6 × 10$^{-10}$ | Colorless and transparent |
| | DnOF | 20 | | | | | | |
| 27 | DtBF | 80 | BPO | 0.1 | 70° C./24 hrs. | 0.205 | 116.4 × 10$^{-10}$ | Colorless and transparent |
| | DTFPF | 20 | | | | | | |
| 28 | DtBF | 80 | BPO | 0.1 | 70° C./24 hrs. | 0.212 | 58.6 × 10$^{-10}$ | Colorless and transparent |
| | DCHF | 20 | | | | | | |
| 29 | DtBF | 55 | BPO | 0.1 | 70° C./24 hrs. | 0.174 | 110.8 × 10$^{-10}$ | Colorless and transparent |
| | DS$_3$PF | 45 | | | | | | |
| 30 | DtBF | 80 | BPO | 0.1 | 70° C./24 hrs. | 0.221 | 128.1 × 10$^{-10}$ | Colorless and transparent |
| | DTFEF | 10 | | | | | | |
| | DS$_2$MF | 10 | | | | | | |
| 31 | DCHF | 20 | BPO | 0.1 | 70° C./24 hrs. | 0.194 | 12.9 × 10$^{-10}$ | Colorless and transparent |
| | DiPF | 80 | | | | | | |
| 32 | DTFEF | 20 | BPO | 0.1 | 70° C./24 hrs. | 0.200 | 21.6 × 10$^{-10}$ | Colorless and transparent |
| | DiPF | 80 | | | | | | |

(note)
DtBF: di-tert-butyl fumarate.
DEF: diethyl fumarate.
DnBF: di-n-butyl fumarate.
DTFEF: bis(2,2,2-trifluoroethyl) fumarate.
DS$_1$PF: bis(3-(trimethylsilyl)propyl) fumarate.
VAc: vinyl acetate.
DDMBF: bis(1,3-dimethylbutyl) fumarate.
DnOF: di-n-octyl fumarate.
DTFPF: bis(2,2,3,3-tetrafluoropropyl) fumarate.
DCHF: dicyclohexyl fumarate.
DS$_3$PF: bis(1,3,3,3-tetramethyl-1-((trimethylsilyl)oxy)disiloxanyl)propyl) fumarate.
DS$_2$MF: bis((pentamethyl-disiloxanyl)methyl) fumarate.
DiPF: diisopropyl fumarate.
AIBN: azobisisobutyronitrile.
BPO: benzoyl peroxide.
SiMA: 3-(3,3,3-trimethyl-1,1-bis((trimethylsilyl)-oxy)disiloxanyl)propyl methacrylate.
iP-HEF: isopropyl(2-hydroxyethyl) fumarate

EXAMPLE 33

A test tube made of glass was charged with 55 mole parts of di-tert-butyl fumarate, 45 mole parts of bis(3-(3,3,3-trimethyl-1,1-bis((trimethylsilyl)oxy)disiloxanyl)-propyl) fumarate and 0.1 mole parts of benzoyl peroxide as a polymerization initiator. The test tube was decompressed to $10^{-3}$ mmHg and was sealed up, and then the polymerization reaction was carried out at a temperature of 70° C. for 24 hours. After the reaction, the obtained polymer was taken out by breaking the seal of the test tube and was heated at a temperature of 100° C. for 3 hours.

The obtained colorless and transparent copolymer was cut off and polished to give a hard contact lens.

The hard contact lens was cut off to give a test piece having a diameter of 15 mm and a thickness of 0.2 mm, and then the oxygen permeability was measured in 0.9% of physiological saline solution by using a film oxygen-gas permeater of Seikaken type.

The oxygen permeability was 117.0×10$^{-10}$ cm$^3$ (STP).cm/cm$^2$.sec.cmHg.

EXAMPLES 34 to 49

The procedure of Example 33 was repeated except that the component of fumaric acid diesters was changed as shown in Table 2 to give a hard contact lens.

The oxygen permeability was measured in the same manner as in Example 33. The results are shown in Table 2.

TABLE 2

| | | | | | Physical properties | |
|---|---|---|---|---|---|---|
| Ex. NO. | Components of fumaric acid diester (mole parts) | | | | Oxgen permeability [cm$^3$ (STP) · cm/cm$^2$ · sec · cmHg] | Appearance |
| 33 | DtBF 55, | DS$_4$PF 45 | | | 117.0 × 10$^{-10}$ | Colorless and transparent |
| 34 | DtBF 80, | DS$_4$PF 20 | | | 69.2 × 10$^{-10}$ | Colorless and transparent |
| 35 | DtBF 80, | DTFEF 10, | DS$_4$PF 10 | | 51.0 × 10$^{-10}$ | Colorless and |

TABLE 2-continued

| Ex. NO. | Components of fumaric acid diester (mole parts) | | | | | | | Oxgen permeability [cm³ (STP)·cm/cm²·sec·cmHg] | Appearance |
|---|---|---|---|---|---|---|---|---|---|
| 36 | DtBF | 70, | DTFEF | 10, | DS₄PF | 20 | | $82.0 \times 10^{-10}$ | transparent Colorless and transparent |
| 37 | DtBF | 60, | DTFEF | 10, | DS₄PF | 30 | | $103.8 \times 10^{-10}$ | Colorless and transparent |
| 38 | DtBF | 60, | DTFPF | 10, | DS₄PF | 30 | | $107.7 \times 10^{-10}$ | Colorless and transparent |
| 39 | DtBF | 60, | DHFiPF | 10, | DS₄PF | 30 | | $116.0 \times 10^{-10}$ | Colorless and transparent |
| 40 | DtBF | 60, | DTFEF | 20, | DS₄PF | 20 | | $82.7 \times 10^{-10}$ | Colorless and transparent |
| 41 | DtBF | 50, | DTFEF | 25, | DS₄PF | 25 | | $89.6 \times 10^{-10}$ | Colorless and transparent |
| 42 | DtBF | 60, | DTFEF | 30, | DS₁PF | 10 | | $33.0 \times 10^{-10}$ | Colorless and transparent |
| 43 | DtBF | 60, | DTFEF | 20, | DS₁PF | 20 | | $33.7 \times 10^{-10}$ | Colorless and transparent |
| 44 | DtBF | 70, | DTFEF | 20, | DS₁PF | 10 | | $31.3 \times 10^{-10}$ | Colorless and transparent |
| 45 | DtBF | 80, | DTFEF | 10, | DS₁PF | 10 | | $30.9 \times 10^{-10}$ | Colorless and transparent |
| 46 | DtBF | 80, | DS₁PF | 20 | | | | $33.2 \times 10^{-10}$ | Colorless and transparent |
| 47 | DtBF | 60, | DTFEF | 10, | DS₃PF | 30 | | $96.8 \times 10^{-10}$ | Colorless and transparent |
| 48 | DtBF | 80, | DTFEF | 10, | DS₃PF | 10 | | $44.1 \times 10^{-10}$ | Colorless and transparent |
| 49 | DtBF | 57, | DTFEF | 9.5, | DS₃PF | 28.5, | DAF 5 | $90.6 \times 10^{-10}$ | Colorless and transparent |

(note)
DHFiPF: bis(hexafluoroisopropyl) fumarate.
DAF: diallyl fumarate
DS₄PF: bis(3-(3,3,3-trimethyl-1,1-bis((trimethylsilyl)oxy)disiloxanyl)propyl) fumarate

EXAMPLE 50

The obtained film in Example 1 was introduced into a reaction tube having 0.40 mmHg of oxygen gas pressure and was plasma-discharged with a high frequency discharge apparatus having a frequency of 13.56 MHz at the power of 50 W for 90 seconds.

The measured contact angle of the obtained discharged film to a waterdrop was about zero by using a sessile drop method.

Then the change of the contact angle of the film to a waterdrop on standing was measured when the film was left in the atmosphere at the room temperature (about 25° C.). The results are shown in Table 3.

COMPARATIVE EXAMPLE 1

The change of the contact angle of a commercially available oxygen permeable lens (made by Toyo Contact Lens Co., Ltd., Trade name: Menikon O₂) on standing was measured in the same manner as in Example 50. The result is shown in Table 3.

TABLE 3

| | Left time (hr) | | | | | |
|---|---|---|---|---|---|---|
| | 0 | 24 | 72 | 125 | 168 | 504 |
| Ex. 50 | 0° | 0° | 16.7° | 44.5° | 53.0° | 57.6° |
| Com. Ex. 1 | 3.3° | 32.9° | 43.0° | 46.2° | 47.6° | 56.8° |

EXAMPLE 51

An ampul made of glass having a volume of 50 ml was charged with 60 mole parts of di-tert-butyl fumarate and 40 mole parts of isopropyl (2,2,2-trifluoroethyl) fumarate and then with 0.1 mole parts of benzoyl peroxide as a polymerization initiator. The ampul was decompressed to $10^{-3}$ mmHg and was sealed up, and then the polymerization reaction was carried out at a temperature of 60° C. for 40 hours.

After the reaction, the formed polymer was dissolved into 100 ml of chloroform and the solution was poured into a large amount of methanol to give a precipitate. The obtained precipitate was filtered and dried to give a formed polymer.

After the formed polymer was dissolved into diethyl ether to give 10% by weight of polymer solution, 5 ml of the polymer solution was flowed and extended on a glass schale having a diameter of 50 mm and then the obtained film was peeled off the schale and the solvent was vaporized at least for 48 hours under vacuum to give a colorless and transparent film.

The obtained film was cut off into a film having a diameter of 15 mm and a thickness of 0.207 mm and then the oxygen permeability was measured by using a film oxygen-gas permeater of Seikaken type. The oxygen permeability was $96.9 \times 10^{-10}$ cm³ (STP).cm/cm².sec.cmHg under standard temperature and pressure (STP).

EXAMPLE 52

The procedure of Example 51 was repeated except that the component of monomers was changed as shown in Table 4, and then the oxygen permeability of the obtained film was measured. The results are shown in Table 4.

EXAMPLE 53

A test tube made of glass was charged with 60 mole parts of di-tert-butyl fumarate and 40 mole parts of isopropyl (3,3,3-trimethyl(1,1-bis(trimethylsilyloxy)-disiloxanyl)propyl) fumarate and then benzoyl peroxide as a polymerization initiator. The test tube was decompressed to $10^{-3}$ mmHg and sealed up, and then the polymerization reaction was carried out at a temperature of 60° C. for 24 hours and then at a temperature of 70° C. for 24 hours by heating.

After the reaction, the obtained polymer was taken out from the test tube and was heated at a temperature of 100° C. for 3 hours. The obtained colorless and transparent copolymer was cut off and polished to give a contact lens. The oxygen permeability of the contact lens was $101.1 \times 10^{-10}$ cm$^3$ (STP).cm/cm$^2$.sec.cmHg.

EXAMPLES 54 to 61

The procedure of Example 53 was repeated except that the component of fumaric acid diesters was changed as shown in Table 4 to give a film. The oxygen permeability of the obtained film was measured in the same manner as in Example 53. The results are shown in Table 4.

EXAMPLE 62

A test tube made of glass was charged with 60 mole parts of di-tert-butyl fumarate, 30 mole parts of bis(3-(3,3,3-trimethyl-1,1-bis((trimethylsilyl)oxy)disiloxanyl)propyl) fumarate, 10 mole of isopropyl(trimethylsilyl) fumarate and then with 0.1 mole parts of benzoyl peroxide as a polymerization initiator. The test tube was decompressed to $10^{-3}$ mmHg was sealed up, and then the polymerization reacion was carried out at a temperature of 55° C. for 96 hours and then at a temperature of 70° C. for 24 hours. After the reaction, the obtained polymer was taken out up by breaking the seal of the test tube and was heated at a temperature of 100° C. for 2 hours and then at a temperature of 130° C. for 2 hours.

The obtained colorless and transparent copolymer was cut off and polished to give a test piece having a diameter of 15 mm and a thickness of 0.2 mm to measure the contact angle of the test piece to water by Erma Contact Angler, Goniometer Type, Model G-I. The contact angle was 106.2° and after the test piece was impregnated into 10N of hydrochloric acid for 15 seconds, washed with water and dried in a decompressed atmosphere for 30 minutes, the contact angle was 81.7°.

The test piece was then subjected to cutting-processing to give a film having a diameter of 15 mm and a thickness of 0.2 mm and the oxygen permeability was measured by using a film oxygen-gas permeater of Seikaken type. The oxygen permeability was $138.1 \times 10^{-10}$ cm$^3$ (STP).cm/cm$^2$.sec.cmHg.

When the test piece was not treated with hydrochloric acid, the oxygen permeability was $138.3 \times 10^{-10}$ cm$^3$ (STP).cm/cm$^2$.sec.cmHg. It shows that although the treatment with hydrochloric acid improves the contact angle, it does not improve the oxygen permeability.

EXAMPLE 63

A polymer was prepared in the same manner as in Example 62 except that component of fumaric acid diesters was changed into as shown in Table 4 and the obtained polymer was cut off to give a sample and a film. The contact angle of the sample and the oxygen permeability of the film were measured. The results are shown in Table 4.

TABLE 4

| Ex. No. | Component of fumaric acid diesters (mole parts) | | | | | | | | | |
|---|---|---|---|---|---|---|---|---|---|---|
| | DtBF | iPF$_3$F | iPS$_4$PF | F$_3$S$_4$F | F$_6$S$_4$F | F$_8$S$_4$F | DS$_4$PF | BF$_3$FS$_2$ | DOFPF | iP-SF |
| 51 | 60 | 40 | | | | | | | | |
| 52 | 80 | 20 | | | | | | | | |
| 53 | 60 | | 40 | | | | | | | |
| 54 | 60 | | | 40 | | | | | | |
| 55 | 60 | | | | 40 | | | | | |
| 56 | 60 | | | | | 40 | | | | |
| 57 | 60 | 20 | | | | | 20 | | | |
| 58 | 59.6 | | | 39.8 | | | | 0.6 | | |
| 59 | 58.2 | | | 38.8 | | | | 3.0 | | |
| 60 | 56.4 | | | 37.6 | | | | 6.0 | | |
| 61 | 60 | | | | | | 30 | | 10 | |
| 62 | 60 | | | | | | 30 | | | 10 |
| 63 | 60 | | | | | | 20 | | | 20 |

| Ex. No. | Appearance | Thickness of a film (mm) | Oxygen permeability [cm$^3$ (STP) · cm/cm$^2$ · sec · cmHg] |
|---|---|---|---|
| 51 | colorless and transparent | 0.207 | $96.9 \times 10^{-10}$ |
| 52 | colorless and transparent | 0.202 | $104.7 \times 10^{-10}$ |
| 53 | colorless and transparent | 0.196 | $101.1 \times 10^{-10}$ |
| 54 | colorless and transparent | 0.207 | $110.9 \times 10^{-10}$ |
| 55 | colorless and transparent | 0.202 | $128.9 \times 10^{-10}$ |
| 56 | colorless and transparent | 0.200 | $92.4 \times 10^{-10}$ |
| 57 | colorless and transparent | 0.188 | $98.9 \times 10^{-10}$ |
| 58 | colorless and transparent | 0.200 | $104.1 \times 10^{-10}$ |
| 59 | colorless and transparent | 0.200 | $98.6 \times 10^{-10}$ |
| 60 | colorless and transparent | 0.200 | $97.4 \times 10^{-10}$ |
| 61 | colorless and transparent | 0.206 | $126.2 \times 10^{-10}$ |

TABLE 4-continued

| | | | |
|---|---|---|---|
| 62 | colorless and transparent | 0.205 | $138.3 \times 10^{-10}$ |
| 63 | colorless and transparent | 0.206 | $96.7 \times 10^{-10}$ |

(note)
iPF$_3$F: isopropyl(2,2,2-trifluoroethyl) fumarate.
iPS$_4$PF: isopropyl(3,3,3-trimethyl(1,1-bis(trimethylsilyloxy)disiloxanyl)propyl) fumarate.
F$_3$S$_4$F: trifluoroethyl(3,3,3-trimethyl(1,1-bis(trimethylsilyloxy)disiloxanyl)-propyl) fumarate.
F$_6$S$_4$F: hexafluoroisopropyl(3,3,3-trimethyl(1,1-bis(trimethylsilyloxy)disiloxanyl)-propyl) fumarate
F$_8$S$_4$F: octafluoropentyl(3,3,3-trimethyl(1,1-bis(trimethylsilyloxy)disiloxanyl)-propyl) fumarate
BF$_3$FS: 1,1,3,3-tetramethyl(bis((11,11,11-trifluoroethyl)trimethylene)fumarate) disiloxane
DOFPF: di(octafluoropropyl) fumarate
iP-SF: isopropyl(trimethylsilyl) fumarate

EXAMPLE 64

A test tube made of glass was charged with 60 mole parts of di-tert-butyl fumarate, 30 mole parts of bis((3,3,3-trimethyl-1,1-bis(trimethylsilyloxy)disiloxanyl)proplyl) fumarate and 10 mole parts of isopropyl(2-hydroxyethyl) fumarate, and then with 0.1 mole parts of benzoyl peroxide as a polymerization initiator. The test tube was decompressed to $10^{-3}$ mmHg and sealed up, and then the polymerization reaction was carried out at a temperature of 60° C. for 24 hours and then at a temperature of 70° C. for 24 hours. After the reaction, the obtained polymer was taken out by breaking the seal of the test tube and was heated at a temperature of 100° C. for 3 hours.

The obtained colorless and transparent copolymer was cut off and polished to give a sample having a diameter of 15 mm and a thickness of 2 mm to measure the contact angle of the sample to water by Erma Contact Angler Goniometer Type, Model G-I. The contact angle was 54.0° and after the sample was impregnated into distilled water for an hour, the contact angle was 48.6°.

The sample was then subjected to cutting-processing to give a film having a diameter of 15 mm and a thickness of 0.2 mm and the oxygen permeability was measured by using a film oxygen-gas permeater of Seikaken type. The oxygen permeability was $110.0 \times 10^{-10}$ cm$^3$ (STP) cm/cm$^2$ sec cmHg.

EXAMPLES 65 TO 69

Polymers were prepared in the same manner as in Example 64 except that kinds and components of fumaric acid diesters were changed into as shown in Table 5 and then the obtained polymers were cut off to give samples and films. The contact angle of the samples and the oxygen permeability of the films were measured. The results are shown in Table 5.

TABLE 5

| Ex. No. | Compounds of fumaric acid diester (mole parts) | | Contact angle | | Oxygen permeability [cm$^3$ (STP) · cm/cm$^2$ · sec · cmHg] |
|---|---|---|---|---|---|
| | | | Just after processing | After 1 hour impregnating | |
| 64 | DtBF | (60) | 54.0° | 48.6° | $110.0 \times 10^{-10}$ |
|  | DS$_4$PF | (30) | | | |
|  | iP-HEF | (10) | | | |
| 65 | DtBF | (60) | 54.4° | 36.0° | $92.0 \times 10^{-10}$ |
|  | DS$_4$PF | (20) | | | |
|  | iP-HEF | (20) | | | |
| 66 | DtBF | (54.5) | 54.2° | 45.4° | $110.0 \times 10^{-10}$ |
|  | DS$_4$PF | (27.3) | | | |
|  | DTFEF | (9.1) | | | |
|  | iP-HEF | (9.1) | | | |
| 67 | DtBF | (60) | 58.1° | 47.4° | $80.4 \times 10^{-10}$ |
|  | F$_3$S$_4$F | (30) | | | |
|  | iP-HEF | (10) | | | |
| 68 | DtBF | (60) | 83.0° | — | $114.3 \times 10^{-10}$ |
|  | DS$_4$PF | (30) | | | |
|  | DTFEF | (10) | | | |
| 69 | DtBF | (60) | 78.0° | 78.0° | $110.9 \times 10^{-10}$ |
|  | F$_3$S$_4$F | (40) | | | |

(note)
iP-HEF: isopropyl(2-hydroxyethyl) fumarate

From the results of Examples 64 to 69, it can be seen that the copolymers in which iP-HEF was not used have a tendensy to decrease the oxygen permeability in comparison to the copolymers in which iP-HEF was used and the former has lower contact angle and increased hidrophilic property.

What is claimed is:

1. A hard contact lens which comprises a cross-linked copolymer having excellent oxygen permeability, good hardness and processability, as well as good hydrophilicity consisting essentially of the following monomers, each based on 100 moles of total fumaric acid esters:

(a) 50 to 80 moles of a dialkyl fumarate,
  (b) 5 to 50 moles of at least one of an alkyl (hydroxyalkyl) fumarate and a monoalkyl fumarate,
  (c) up to 20 moles of at least one cross-linking agent selected from the group consisting of diallyl fumarate, allyl methacrylate, allyl acrylate, trimethylolpropane trimethacrylate, trimethylolpropane triacrylate, ethylene glycol diacrylate, ethylene glycol dimethacrylate, divinylbenzene and a cross-linking agent represented by the general formula (XI):

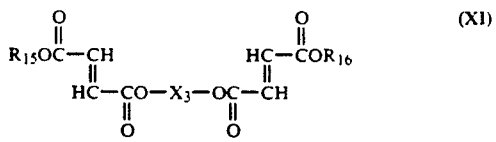

wherein $R_{15}$ and $R_{16}$ are respectively, independently, selected from the group consisting of $R_1$, $R_{11}$, and $R_{12}$; $X_3$ is an ethylene group or a group having the formula:

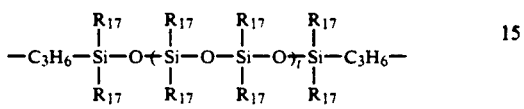

wherein $R_{17}$ is —$CH_3$ or

t is 0 or an integer of 1 to 55, $R_1$ is a straight alkyl group, a branched alkyl group or a cyclic alkyl group having 1 to 13 carbon atoms, $R_{11}$ is —$(CH_2)$-$_{k3}$—$C_cH$ $F_{2c+1-d}$, c is an integer of 1 to 21, d is 0 or 1 and $k_3$ is 0 or an integer of 1 to 3, $R_{12}$ is

l3 is 1 or 3, D is —$CH_3$ or

and (d) up to 50 moles of at least one member selected from the group consisting of an alkyl(silicon-containing alkyl) fumarate, an alkyl(fluoroalkyl) fumarate, and a fluoroalkyl(silicon-containing alkyl) fumarate, containing at least two different fumaric acid diesters.

2. A hard contact lens which comprises a cross-linked copolymer having excellent oxygen permeability, good hardness and processability, as well as good hydrophilicity consisting essentially of the following monomers, each based on 100 moles of total fumaric acid esters:

(a) 50 to 80 moles of a dialkyl fumarate, (b) up to 20 moles of at least one cross-linking agent selected from the group consisting of diallyl fumarate, allyl methacrylate, allyl acrylate, trimethylolpropane trimethacrylate, trimethylolpropane triacrylate, ethylene glycol diacrylate, ethylene glycol dimethacrylate, divinylbenzene and a cross-linking agent represented by the general formula (XI):

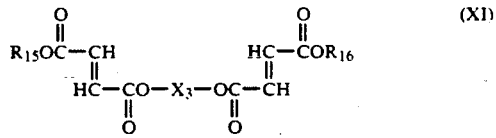

wherein $R_{15}$ and $R_{16}$ are respectively, independently, selected from the group consisting of $R_1$, $R_{11}$, and $R_{12}$; $X_3$ is an ethylene group or a group having the formula:

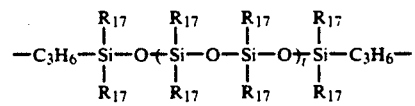

wherein $R_{17}$ is —$CH_3$ or

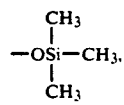

t is 0 or an integer of 1 to 55, $R_1$ is a straight alkyl group, a branched alkyl group or a cyclic alkyl group having 1 to 13 carbon atoms, $R_{11}$ is —$(CH_2)$-$_{k3}$—$C_cH$ $F_{2c+1-d}$, c is an integer of 1 to 21, d is 0 or 1 and $k_3$ is 0 or an integer of 1 to 3, $R_{12}$ is

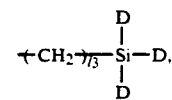

l3 is 1 or 3, D is —$CH_3$ or

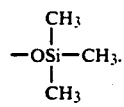

and (c) 5 to 50 moles of at least one member selected from the group consisting of an alkyl (silicon-containing alkyl) fumarate, an alkyl (fluoroalkyl) fumarate, and a fluoroalkyl (silicon-containing alkyl) fumarate containing at least two different fumaric acid diesters.

3. A hard contact lens which comprises a cross-linked copolymer having excellent oxygen permeability, good hardness and processability, as well as good hydrophilicity consisting essentially of following monomers, each based on 100 moles of total fumaric acid esters:

(a) 50 to 80 moles of a dialkyl fumarate, (b) 5 to 50 moles of a member selected from the group consisting of (i) a di(fluoroalkyl) fumarate, (ii) a di(silicon-containing alkyl) fumarate and (iii) a combination of (i) and (ii), (c) up to 20 moles of at least one cross-linking agent selected from the group consisting of diallyl fumarate, allyl methacrylate, allyl acrylate, trimethylolpropane trimethacrylate, trimethylolpropane triacrylate, ethylene glycol diacrylate, ethylene glycol dimethacrylate, divinylbenzene and a cross-linking agent represented by the general formula (XI):

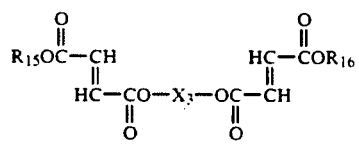

wherein $R_{15}$ and $R_{16}$ are respectively, independently, selected from the group consisting of $R_1$, $R_{11}$, and $R_{12}$; $X_3$ is an ethylene group or a group having the formula:

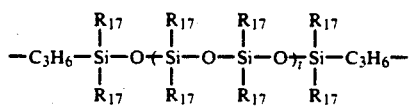

wherein $R_{17}$ is —$CH_3$ or

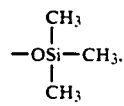

t is 0 or an integer of 1 to 55, $R_1$ is a straight alkyl group, a branched alkyl group or a cyclic alkyl group having 1 to 13 carbon atoms, $R_{11}$ is —$(CH_2)$-$k_3$—$C_cH$ $F_{2c+1-d}$, c is an integer of 1 to 21, d is 0 or 1 and $k_3$ is 0 or an integer of 1 to 3, $R_{12}$ is

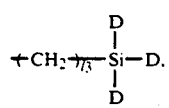

l3 is 1 or 3, D is —$CH_3$ or

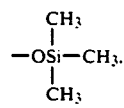

(d) up to 50 moles of at least one member selected from the group consisting of an alkyl(silicon-containing alkyl) fumarate, an alkyl(fluoroalkyl) fumarate and a fluoroalkyl(silicon-containing alkyl) fumarate, and (e) up to 35 moles of monomers other than said fumaric acid esters containing at least two different fumaric acid diesters.

4. The contact lens of claim 3 wherein monomer (b) is a di(silicon-containing alkyl) fumarate of the following formula (VI):

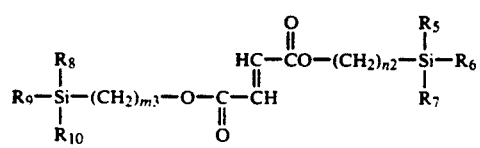

wherein $m_3$ and $n_2$ are 1 or 3; $R_5$, $R_6$, $R_7$, $R_8$, $R_9$, and $R_{10}$ are a methyl group or

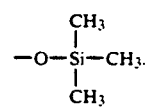

5. A hard contact lens which comprises a cross-linked copolymer having excellent oxygen permeability, good hardness and processability, as well as good hydrophilicity consisting essentially of the following monomers, each based on 100 moles of total fumaric acid esters:

(a) 50 to 80 moles of a dialkyl fumarate,
(b) 5 to 45 moles of a member selected from the group consisting of (i) a di(fluoroalkyl) fumarate, (ii) a di(silicon-containing alkyl) fumarate and (iii) a combination of (i) and (ii),
(c) 5 to 30 moles of an alkyl(hydroxyalkyl) fumarate and/or a monoalkyl fumarate,
(d) up to 20 moles at least one cross-linking agent selected from the group consisting of diallyl fumarate, allyl methacrylate, allyl acrylate, trimethylolpropane, trimethacrylate, trimethylolpropane triacrylate, ethylene glycol diacrylate, ethylene glycol dimethacrylate, divinylbenzene and a cross-linking agent represented by the general formula (XI):

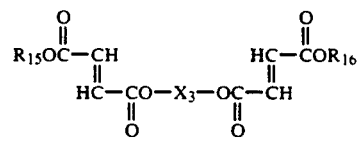

wherein $R_{15}$ and $R_{16}$ are respectively, independently, selected from the group consisting of $R_1$, $R_{11}$, and $R_{12}$; $X_3$ is an ethylene group or a group having the formula:

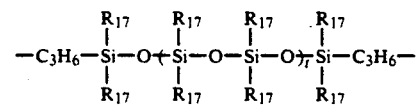

wherein $R_{17}$ is —$CH_3$ or

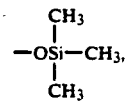

t is 0 or an integer of 1 to 55, $R_1$ is a straight alkyl group, a branched alkyl group or a cyclic alkyl group having 1 to 13 carbon atoms, $R_{11}$ is —$(CH_2)$-$k_3$—$C_cH$ $F_{2c+1-d}$, c is an integer of 1 to 21, d is 0 or 1 and $k_3$ is 0 or an integer of 1 to 3, $R_{12}$ is

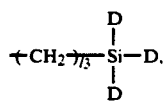

l3 is 1 or 3, D is —$CH_3$ or

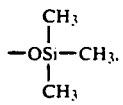

(e) up to 50 moles of at least one member selected from the group consisting of an alkyl(silicon-containing alkyl) fumarate, an alkyl(fluoroalkyl) fumarate, and a fluoroalkyl(silicon-containing alkyl) fumarate, and (f) up to 35 moles of monomers other than said different fumaric acid esters containing at least two fumaric acid diesters.

6. The contact lens of claim 5, wherein monomer (b) is a di(silicon-containing alkyl) fumarate of the following formula (VI):

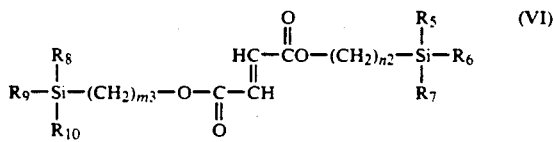

wherein $m_3$ and $n_2$ are 1 or 3; $R_5$, $R_6$, $R_7$, $R_8$, $R_9$, and $R_{10}$ are a methyl group or

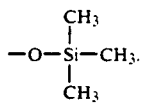

7. The hard contact lens of claim 1 in which the copolymer also contains up to 35 moles of monomers other than said fumaric acid esters.

8. The hard contact lens of claim 2 in which the copolymer also contains up to 35 moles of monomers other than said fumaric acid esters.

9. The hard contact lens of claim 1 wherein said cross-linked copolymer is of said monomers and, in addition, a minor amount of an alkyl (trimethylsilyl) fumarate.

10. The hard contact lens of claim 2 wherein said cross-linked copolymer is of said monomers and, in addition, a minor amount of an alkyl (trimethylsilyl) fumarate.

11. The hard contact lens of claim 3 wherein said cross-linked copolymer is of said monomers and, in addition, a minor amount of an alkyl (trimethylsilyl) fumarate.

12. The hard contact lens of claim 5 wherein said cross-linked copolymer is of said monomers and, in addition, a minor amount of an alkyl (trimethylsilyl) fumarate.

13. The hard contact lens of claim 1 wherein said monomer (d) is a fluoroalkyl (silicon-containing alkyl) fumarate.

14. The hard contact lens of claim 2 wherein said monomer (c) is a fluoroalkyl (silicon-containing alkyl) fumarate.

15. The hard contact lens of claim 3 wherein said monomer (d) is a fluoroalkyl (silicon-containing alkyl) fumarate.

16. The hard contact lens of claim 5 wherein said monomer (e) is a fluoroalkyl (silicon-containing alkyl) fumarate.

17. The hard contact lens of claim 1 containing at least 0.6 mole of said cross-linking agent.

18. The hard contact lens of claim 2 containing at least 0.6 mole of said cross-linking agent.

19. The hard contact lens of claim 3 containing at least 0.6 mole of said cross-linking agent.

20. The hard contact lens of claim 5 containing at least 0.6 mole of said cross-linking agent.

* * * * *